(12) United States Patent
Ueda

(10) Patent No.: US 10,594,883 B2
(45) Date of Patent: Mar. 17, 2020

(54) IMAGE FORMING SYSTEM

(71) Applicant: KONICA MINOLTA, INC., Tokyo (JP)

(72) Inventor: Hiroki Ueda, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/204,177

(22) Filed: Nov. 29, 2018

(65) Prior Publication Data

US 2019/0191047 A1 Jun. 20, 2019

(30) Foreign Application Priority Data

Dec. 18, 2017 (JP) .................................. 2017-241934

(51) Int. Cl.
H04N 1/00 (2006.01)

(52) U.S. Cl.
CPC ..... H04N 1/00633 (2013.01); H04N 1/00129 (2013.01); H04N 1/00167 (2013.01); H04N 1/00236 (2013.01)

(58) Field of Classification Search
CPC ................................. H04N 1/00633
USPC .......................................... 358/498
See application file for complete search history.

(56) References Cited

U.S. PATENT DOCUMENTS

| 2005/0220475 A1* | 10/2005 | Kasahara | ............... | B65H 31/24 399/82 |
| 2012/0001387 A1* | 1/2012 | Mutsuno | ............... | B65H 31/24 271/298 |
| 2017/0217712 A1* | 8/2017 | Ishizuka | ............... | B65H 31/10 |
| 2017/0305701 A1* | 10/2017 | Kotani | ............... | B65H 31/10 |
| 2018/0157446 A1* | 6/2018 | Fukuda | ............... | B41J 13/0009 |

FOREIGN PATENT DOCUMENTS

| JP | 2014144627 A | 8/2014 |
| JP | 2015049189 A | 3/2015 |
| JP | 2015179122 A | 10/2015 |
| JP | 2017048019 A | 3/2017 |

OTHER PUBLICATIONS

Masaru, Image Forming System Control Method of Image Forming System and Recording Medium Ejection Control Device, Aug. 10, 2015, Machine Translated Japanese Patent Application Publication JP 2015-179122, All Pages (Year: 2015).*

* cited by examiner

Primary Examiner — Benjamin O Dulaney
(74) Attorney, Agent, or Firm — Buchanan Ingersoll & Rooney PC

(57) ABSTRACT

An image forming system includes a hardware processor that acquires results of reading of an image on a recording medium read by an image reader, determines quality of the image, and controls an ejector and sheet ejection into the ejector, the recording medium being ejected into the ejector, the ejector including a stacker, wherein the stacker includes an elevating tray on which ejected recording mediums are stacked, and has a mechanism that enables removal of a recording medium placed on the elevating tray while the elevating tray is descending, the elevating tray being capable of ascending and descending, and, when the stacker is set as an ejection destination at a time of reading of the image and ejecting the recording medium into the ejector, and the image is determined to be abnormal, the hardware processor determines a timing to cause the elevating tray of the set stacker to descend.

18 Claims, 12 Drawing Sheets

IMAGE FORMING SYSTEM

The entire disclosure of Japanese patent Application No. 2017-241934, filed on Dec. 18, 2017, is incorporated herein by reference in its entirety.

BACKGROUND

Technological Field

The present invention relates to an image forming system that has a function of reading an image on a recording medium to determine the quality of the image, and ejects the recording medium into an ejector including a stacker.

Description of the Related Art

In production printing and the like, a task of checking whether the printed material is in a desired state is common, and in recent years, abnormal image detecting techniques using CCD cameras or the like have been suggested (JP 2015-049189 A, JP 2015-179122 A, and JP 2014-144627 A, for example). In addition to that, there are generally known techniques for switching sheet ejection destinations for a paper sheet from which an abnormality is detected, issuing a warning about the abnormality, indicating the paper sheet to be removed, and the like.

For example, in JP 2015-049189 A and JP 2015-179122 A, control is performed so that a paper sheet determined to have an abnormal image is ejected onto a sheet catch tray for the paper sheets to be discarded. In JP 2015-049189 A, a plurality of recording medium storage units are controlled in accordance with information indicating the ejection destination, so that it is possible to switch to such a state that the recording mediums stored in the respective recording medium storage units can be recovered in order of ejection of the recording mediums. In JP 2015-179122 A, a plurality of sheet catch tray designating units are controlled in order of pages of the paper sheets ejected onto the respective sheet catch trays in accordance with information indicating the sheet ejection destination. Thus, the recovery of the paper sheets from the corresponding sheet catch tray can be facilitated in order of pages.

In JP 2014-144627 A, in a case where a paper sheet is determined to be defective as a result of determination as to whether the paper sheet is defective, the pages including the page determined to be defective and the pages that follow are reprinted, and control is performed so that the paper sheets are ejected into a different sheet ejection destination from the sheet ejection destination used immediately before the defect determination. Thus, wasted paper sheets can be readily removed.

In JP 2017-048019 A, in a machining defective cardboard sheet removing apparatus that automatically removes defective cardboard, a cardboard sheet that has a machining defect and is being conveyed on a belt conveyor is ejected in a different direction from the direction of conveyance, in accordance with a detection signal from a machining defect detector.

Meanwhile, in an image forming system that includes a device (a stacker) having a large-capacity stacking function and a device that detects an abnormal image, printing paper sheets including a paper sheet determined to have an abnormal image (this paper sheet will be hereinafter referred to as a wasted paper sheet) are normally ejected into the stacker.

When the wasted paper sheet in the stacker is removed, it is necessary to cause the elevating tray in the stacker to descend, open the front door of the stacker, and find the wasted paper sheet from among the stacked paper sheets before removing the wasted paper sheet. These operations require a long time and are troublesome. As a result, work efficiency becomes lower.

SUMMARY

The present invention has been made in view of the above circumstances, and an object of the present invention is to provide an image forming system that is capable of removing, without fail, a recording medium having an image with an abnormality, by controlling a stacker and a device that detects an abnormal image, while minimizing the decrease in productivity.

To achieve the abovementioned object, according to an aspect of the present invention, an image forming system reflecting one aspect of the present invention comprises a hardware processor that has a function of acquiring results of reading of an image on a recording medium read by an image reader, and determining quality of the image, and controls an ejector and sheet ejection into the ejector, the recording medium being capable of being ejected into the ejector, the ejector including at least a stacker, wherein the stacker includes an elevating tray on which ejected recording mediums are stacked, and has a mechanism that enables removal of a recording medium placed on the elevating tray while the elevating tray is descending, the elevating tray being capable of ascending and descending, and, when the stacker is set as an ejection destination at a time of reading of the image on the recording medium and ejecting the recording medium into the ejector, and the image is determined to be abnormal through the determination of the quality of the image, the hardware processor determines a timing to cause the elevating tray of the set stacker to descend.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, an image forming system according to one or more embodiments of the present invention will be described with reference to the accompanying drawings. However, the scope of the invention is not limited to the disclosed embodiments.

Figure 1:
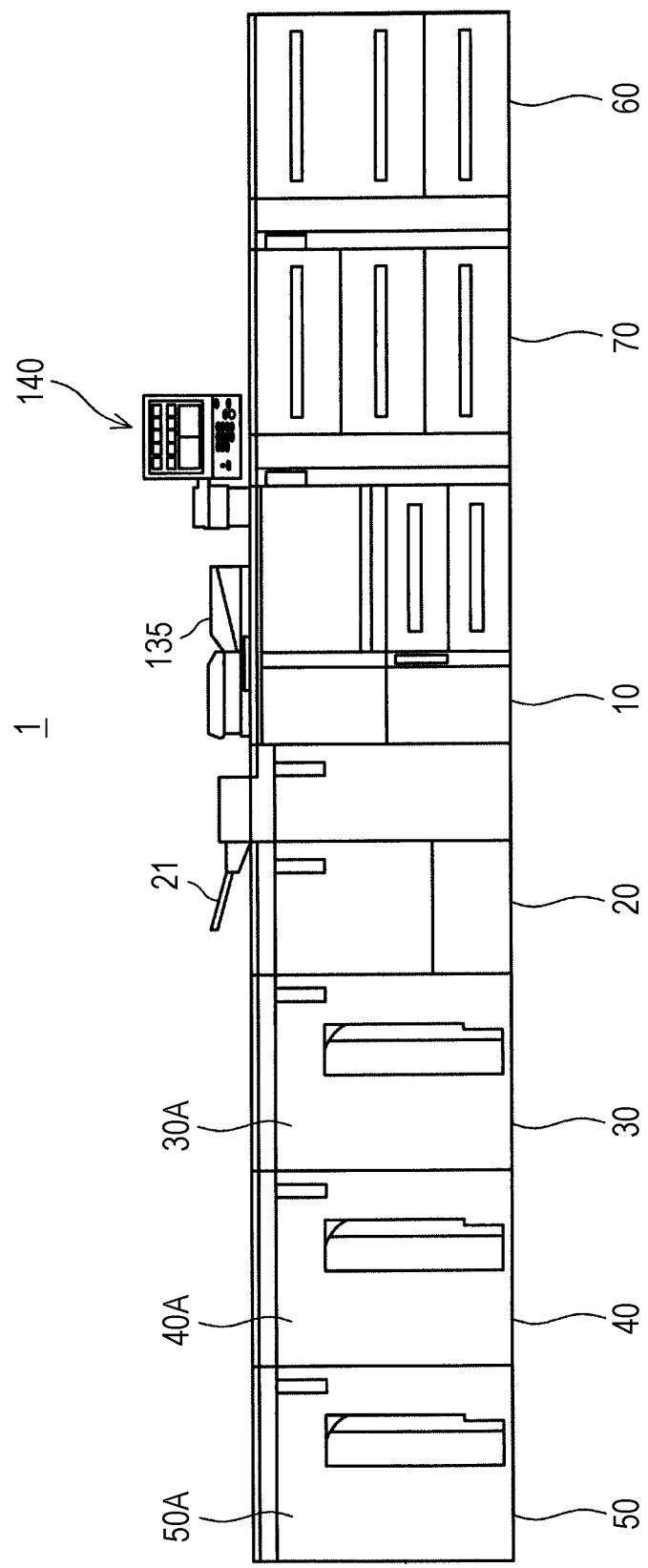
FIG. 1 is a diagram schematically showing an image forming system according to an embodiment of the present invention.

In the image forming system 1, apparatuses are connected in multiple stages, as shown in FIG. 1.

In the image forming apparatus 10 that performs image formation, a large-capacity sheet feeding unit 60 and a large-capacity sheet feeding unit 70 are connected in a preprocessing stage. Paper sheets are stored in the large-capacity sheet feeding units 60 and 70 so that the paper sheets can be supplied to the image forming apparatus 10. The paper sheets are equivalent to the recording medium of an embodiment of the present invention. The material of the recording medium is not necessarily paper, and may be made of a material such as fabric or plastic.

A paper sheet supplied from the large-capacity sheet feeding unit 60 or the large-capacity sheet feeding unit 70 is conveyed to the image forming apparatus 10.

A reading device 20 is connected to the stage after the image forming apparatus 10, and a paper sheet on which an image is formed by the image forming apparatus 10 is conveyed and introduced into the reading device 20.

The reading device 20 includes an image reader that reads an image on a paper sheet. The image reader is not shown in FIG. 1, but will be described later in detail. A sheet catch tray 21 is provided on the housing of the reading device 20. In a case where paper sheets are not conveyed to the downstream side of the reading device 20, the paper sheets are ejected onto the sheet catch tray 21.

Three stackers 30, 40, and 50 are connected in series to the stage after the reading device 20.

A paper sheet conveyed from the reading device 20 can be ejected into any one of the stackers 30, 40, and 50. Alternatively, a sheet catch tray other than stackers may be provided. The stackers 30, 40, and 50 are equivalent to the ejector of an embodiment of the present invention. In a case where the reading device 20 can eject a paper sheet onto the sheet catch tray 21 in accordance with a result of determination of the quality of the image after reading the image with the image reader, the sheet catch tray 21 is also included in the ejector according to an embodiment of the present invention.

The image forming system 1 according to an embodiment of the present invention does not necessarily have the above configuration, and may further include other devices. Also, the large-capacity sheet feeding units are not necessarily provided, and the number of the stackers is not limited to any particular number. Further, a post-processing device that performs appropriate post-processing such as stapling, punching, booklet processing, or the like on the paper sheets stacked on a stacker may be provided in the stage after the stacker.

In the above described example of the present invention, the reading device 20 and the stackers 30, 40, and 50 are mechanically connected to the image forming apparatus 10 in an in-line manner. However, the reading device 20 and the stackers 30, 40, and 50 may not be mechanically connected to the image forming apparatus 10.

Figure 2:
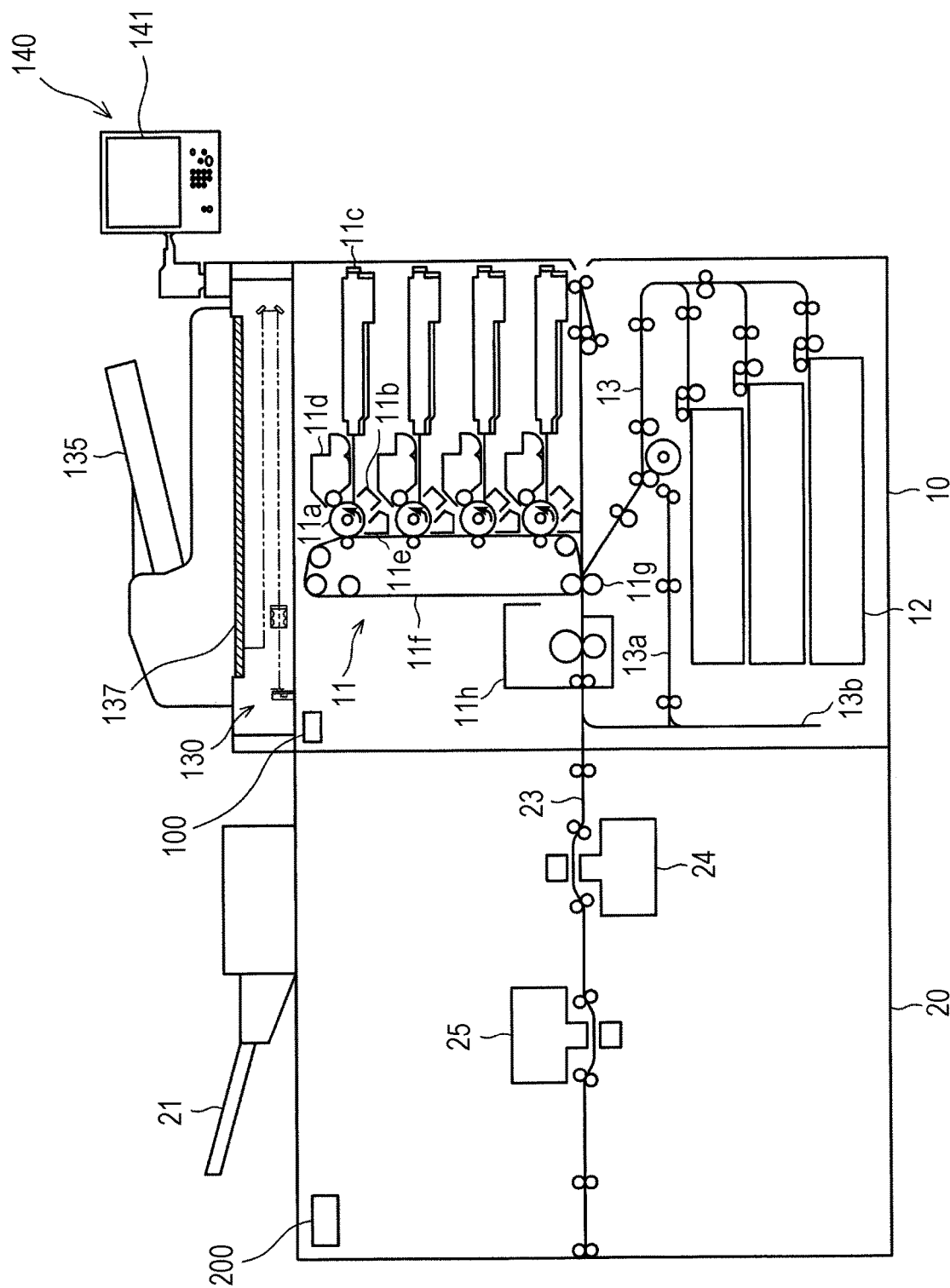
FIG. 2 is a diagram showing a mechanical outline of part of the image forming system.

Next, an outline of the mechanical configuration of part of the image forming system 1 is described, with reference to FIG. 2.

The image forming apparatus 10 includes, on an upper portion of the housing, an operation unit 140 that displays information and accepts operation inputs. The operation unit 140 has a touch-panel LCD 141 capable of displaying various kinds of operation screens. The LCD 141 is equivalent to a display unit and an operation unit.

An automatic document feeder (ADF) 135 is further provided on an upper portion of the housing of the image forming apparatus 10. The automatic document feeder (ADF) 135 can automatically feed a set document, and the document being fed is read by the CCD of a scanner unit 130.

A platen glass 137 is also provided on an upper portion of the housing of the image forming apparatus 10, and reading of the document can be performed when a document is set on the platen glass 137.

On the lower side of the housing of the image forming apparatus 10, a main-body sheet feeding unit 12 that stores paper sheets is provided. The main-body sheet feeding unit 12 can supply the stored paper sheets to a conveyance path 13. The paper sheets are equivalent to the recording medium of an embodiment of the present invention. In an embodiment of the present invention, the material of the recording medium stored in the main-body sheet feeding unit 12 is not necessarily paper, and may be made of a material such as fabric or plastic.

The conveyance path 13 is formed inside the housing of the image forming apparatus 10. Conveyance rollers are provided along the conveyance path 13. As the conveyance rollers are driven, the conveyance path 13 conveys a paper sheet supplied from the main-body sheet feeding unit 12. A paper sheet may also be introduced from the large-capacity sheet feeding unit 60 or the large-capacity sheet feeding unit 70 into the conveyance path 13, and be conveyed. In a case where a manual sheet feed tray (not shown) is provided, a paper sheet may be introduced from the manual sheet feed tray into the conveyance path 13, and be conveyed.

An image forming part 11 is provided in the conveyance path 13. The image forming part 11 includes photosensitive members 11a for the respective colors. Around each of the photosensitive members 11a for the respective colors, a charger 11b, an exposure unit 11c, a developing unit 11d, and a cleaning unit 11e are provided in this order in the counterclockwise direction. Each photosensitive member 11a can be brought into contact with an intermediate transfer belt 11f between the developing unit 11d and the cleaning unit 11e. In the drawing, only the photosensitive member, the charger, the exposure unit, and the developing unit provided for one color are denoted by reference numerals. However, the same components are provided for each of the other colors, and these components are disposed along the intermediate transfer belt 11*f*.

Examples of the colors include magenta, cyan, yellow, and black. However, the number of the colors is not limited to the above.

The intermediate transfer belt 11*f* can come into contact with a paper sheet in the conveyance path 13 at a secondary transfer unit 11*g*. A fixing device 11*h* is provided at a position on the downstream side of the secondary transfer unit 11*g* in the direction of conveyance in the conveyance path 13.

In a case where an image is to be formed on a paper sheet, the surface of a photosensitive member 11*a* is electrically charged by the charger 11*b*, and a latent image is formed on the surface of the photosensitive member 11*a* by the exposure unit 11*c* in accordance with the image data. After that, the formed latent image is developed by the developing unit 11*d*, to be a toner image. The toner image on the photosensitive member 11*a* is transferred onto the intermediate transfer belt 11*f*. These operations are also performed on the photosensitive members 11*a* for the other colors, and the toner images of the respective colors are transferred to the intermediate transfer belt 11*f* in an overlapping manner. The toner image on the intermediate transfer belt 11*f* is transferred onto the paper sheet at the secondary transfer unit 11*g*, and the image transferred onto the paper sheet is heated and fixed by the fixing device 11*h*.

On the downstream side of the fixing device 11*h*, a reverse conveyance path 13*a* branches from the conveyance path 13. A reversing unit 13*b* is provided in the reverse conveyance path 13*a*. At the reversing unit 13*b*, the front and back of the paper sheet sent into the reversing unit 13*b* are switched, and the front and back surfaces are reversed before the paper sheet is sent to the downstream side of the reverse conveyance path 13*a*. The downstream end of the reverse conveyance path 13*a* joins the conveyance path 13 at a position on the upstream side of the image forming part 11.

In a case where an image is to be formed on the back surface of the paper sheet, the paper sheet that has passed through the fixing device 11*h* is introduced into the reverse conveyance path 13*a*. The front and back of the paper sheet are switched, and the front and back of the paper sheet are reversed by the reversing unit 13*b*. The paper sheet is then conveyed back to the upstream side in the conveyance path 13, and image formation is then performed on the back surface of the paper sheet at the image forming part 11.

In a case where only a reversal of the front and back of the paper sheet is to be performed, the paper sheet is introduced into the reverse conveyance path 13*a*, and is conveyed to the conveyance path 13 on the downstream side of the fixing device 11*h* while being kept in the reversed state.

In a case where the paper sheet is not to be reversed, or where image formation is not to be performed on the back surface, the paper sheet is conveyed straightforward, without being sent into the reverse conveyance path 13*a*.

The image forming apparatus 10 includes an image controller 100 that controls the entire image forming system 1. The image controller 100 can be formed with a CPU, a program operating in the CPU, a storage unit that stores the program, setting data, and the like. The image controller 100 can perform control in the reading device 20 and the stackers 30, 40, and 50, and can further determine the quality of an image by acquiring a read result of the image acquired by the reading device 20. Accordingly, in this embodiment, the image controller 100 is equivalent to the controller of an embodiment of the present invention.

The conveyance path 13 is connected to a conveyance path 23 of the reading device 20 in the subsequent stage, and a paper sheet ejected from the image forming apparatus 10 is conveyed into the conveyance path 23 of the reading device 20.

The reading device 20 includes, in the conveyance path 23, an image reader 24 that reads the image on the lower surface of a paper sheet, and an image reader 25 that reads the image on the upper surface of a paper sheet. The image reader 24 and the image reader 25 are disposed in this order from the upstream side in the direction of sheet conveyance. The image reader 24 reads the image on the lower surface of a paper sheet being sent in the conveyance path 23, and the image reader 25 reads the image on the upper surface of the paper sheet being sent on the conveyance path 23.

The image readers 24 and 25 may be formed with line sensors such as CMOS sensors or CCD sensors, for example. Read data acquired by the image readers 24 and 25 is transmitted as read results to an image control CPU 113 provided in the image forming apparatus 10, and is used for determination of image defects (wasted paper sheets) and various kinds of adjustment. The paper sheets discharged from the reading device 20 are ejected into the stacker 30. In a case where the conveyance path 23 branches off on the downstream side of the image reader 25, and is connected to the sheet catch tray 21, paper sheets may be ejected onto the sheet catch tray 21 as necessary.

In this embodiment, the image readers 24 and 25 are provided in the reading device 20. However, the number of image readers is not limited to any particular number, and it is possible to use different types of readers, and, for example, the readers may include a colorimeter as a reader that is not a line sensor.

Next, the basic structure of the stackers is described with reference to FIG. 3.

The stacker 30 is connected to the stage immediately after the reading device 20, and paper sheets conveyed from the reading device 20 are introduced into the stacker 30.

The stacker 30 has an elevating tray 31. The elevating tray 31 ascends to the elevated position so that the ejected sheet receiving position is located at an appropriate position before an ejected paper sheet is received. The elevating tray 31 descends every time an ejected paper sheet is to be received, and thus, sequentially receives ejected paper sheets. In a case where paper sheets are not to be ejected into the stacker 30, each paper sheet is conveyed to the ejector or the like in a later stage.

At the lowermost portion of the stacker 30, a carriage 32 is provided. When the paper sheets on the elevating tray 31 are removed, the elevating tray 31 is lowered to the lowermost position, and the carriage 32 is pulled out, so that the paper sheets are taken out from the stacker 30. Note that a front door 30A is provided in the stacker 30, and the front door 30A is locked and cannot be opened at a time of sheet ejection. When a command to remove paper sheets is received in the stacker 30, the elevating tray 31 is lowered to the lowermost position, and the front door 30A is unlocked after the descent of the elevating tray 31 is stopped. Thus, the front door 30A can be opened, and the paper sheets can be removed from the stacker 30.

The descent of the elevating tray 31 and the locking and unlocking of the front door 30A can be controlled by an ejector controller 300. The ejector controller 300 may sense a sheet ejected state or the like, or independently perform control by pressing an eject button or the like provided on the stacker 30. Alternatively, the ejector controller 300 may perform control in accordance with a command from the image controller 100.

In the above description, only the stacker 30 has been described, but the stackers 40 and 50 each have the same structure and include an elevating tray, a carriage, a front door, and an ejector controller. Therefore, the structures of the stackers 40 and 50 are not specifically described herein.

Figure 4:
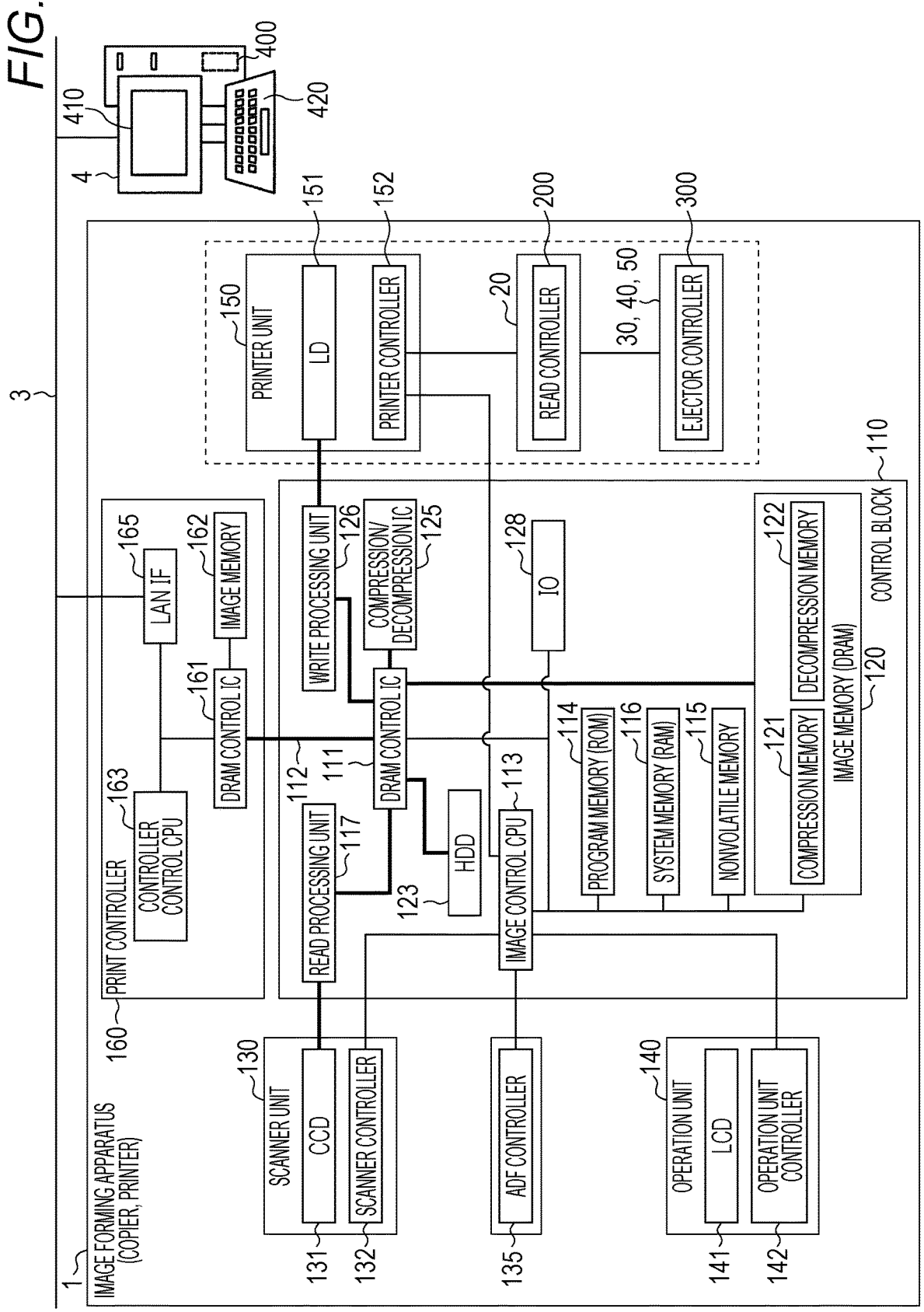
FIG. 4 is a diagram showing the control block of the image forming system.

Next, the functional configuration of the image forming system 1 is described, with reference to the block diagram shown in FIG. 4.

The image forming system 1 includes a control block 110, a scanner unit 130, an operation unit 140, a printer unit 150, and a print controller 160 as principal components.

The print controller 160 receives and processes image data input from an external device 4 used as a terminal PC through a network 3, or enables transfer of image data obtained by the scanner unit 130 to the external device 4 or the like through the network 3.

The control block 110 has a PCI bus 112 connected to the print controller 160, and a DRAM control IC 111 is connected to the PCI bus 112. An image memory (DRAM) 120 is connected to the DRAM control IC 111. The image memory (DRAM) 120 includes a compression memory 121 for storing compressed image data, and a decompression memory 122 for temporarily storing uncompressed image data to be printed prior to image formation.

A hard disk (HDD) 123 is also connected to the DRAM control IC 111, and the hard disk (HDD) 123 stores image data acquired by the scanner unit 130, image data acquired by the print controller 160, and the like.

The image data acquired by the print controller 160 and the image data stored in the hard disk (HDD) 123 are transmitted to the DRAM control IC 111 through the PCI bus 112 in conjunction with a printing operation.

The control block 110 includes an image control CPU 113, and the DRAM control IC 111 is connected to the image control CPU 113.

A program memory (ROM) 114, a system memory (RAM) 116, and a nonvolatile memory 115 are also connected to the image control CPU 113. The program memory (ROM) 114 is formed with a ROM, and stores a program and the like for causing the image control CPU 113 to operate. The system memory (RAM) 116 is formed with a RAM, and is used as a work area or the like. A nonvolatile memory 115 is formed with a flash memory or the like.

The nonvolatile memory 115 stores initial setting information about the image forming apparatus 10, machine setting information such as process control parameters, post-processing settings, sheet information data, tray setting information, a method of determining the quality of images in accordance with results of reading performed by the image readers 24 and 25, and the like.

The image control CPU 113 is capable of reading nonvolatile data in the nonvolatile memory 115, and can write desired data into the nonvolatile memory 115.

Predetermined operations are performed in accordance with the program stored in the program memory (ROM) 114, and the image control CPU 113 controls operations of the respective components of the image forming apparatus 10, the reading device 20, and the stackers 30, 40, and 50, in accordance with the above mentioned machine setting information, print setting information, output settings, and the like. The image control CPU 113, together with the program memory (ROM) 114, the system memory (RAM) 116, the nonvolatile memory 115, and the like, forms the image controller 100 of an embodiment of the present invention, and executes a job, determines the quality of images in accordance with results of image reading performed by the reading device, and performs control of the stackers 30, 40, and 50, and the like. That is, in the image controller 100, the image control CPU 113, which functions as the controller of an embodiment of the present invention, may control the respective components in accordance with job output settings, operation designations, and the like that are input through the operation unit 140 or an external operation unit of the external device 4.

The scanner unit 130 includes a CCD 131 that performs optical reading, and a scanner controller 132 that controls the entire scanner unit 130. The scanner controller 132 is connected to the image control CPU 113 so that serial communication can be performed in between. The CCD 131 is also connected to a read processing unit 117, and the read processing unit 117 is connected to the DRAM control IC 111 in a controllable manner.

At the read processing unit 117, image data read by the CCD 131 is processed. The read processing unit 117 performs various kinds of processing such as analog signal processing, A/D (analog to digital) conversion, and shading on an analog image signal that is input from the CCD 131. The read processing unit 117 then generates digital image data, and outputs the digital image data to a compression/decompression IC 125.

An ADF controller 135 is also connected to the image control CPU 113 in a controllable manner, and the ADF controller 135 controls a flow-type automatic document feeder (ADF) (not shown).

The scanner unit 130 reads a document placed on the upper platen glass of the image forming apparatus 10, or an image of a document being automatically conveyed by the automatic document feeder (ADF) 135.

The operation unit 140 includes the LCD 141 equipped with a touch panel, and an operation unit controller 142 that controls the entire operation unit 140. Accordingly, the operation unit 140 serves as both an operation unit and a display unit. The operation unit controller 142 is connected to the image control CPU 113 so that serial communication can be performed.

Under the control of the image control CPU 113, the operation unit 140 is capable of, via the LCD 141, inputting machine settings such as the output condition settings and the operation control conditions of the image forming apparatus 10, inputting the settings of paper information (size and paper type) about each sheet feed tray, displaying information about a detected wasted paper sheet or the like, executing an instruction to perform recovery printing when there is a wasted paper sheet, displaying the procedures for replacing a wasted paper sheet ejected into the ejector with a recovery printing paper sheet, and the like.

The compression/decompression IC 125 capable of compressing or decompressing image data is connected to the DRAM control IC 111. In accordance with an instruction from the image control CPU 113, the DRAM control IC 111 controls image data compressing processes and compressed image data decompressing processes being performed by the compression/decompression IC 125, and also performs inputting/outputting of image data to the image memory (DRAM) 120.

A write processing unit 126 is also connected to the DRAM control IC 111. The write processing unit 126 is connected to the image forming part 11 including an LD 151 and the like of the printer unit 150, and generates write data to be used in an operation of the LD 151 in accordance with image data.

The printer unit 150 includes a printer controller 152, and the printer controller 152 is connected to the image control CPU 113 so that serial communication can be performed. The printer controller 152 operates in accordance with a control command from the image control CPU 113, and controls the entire printer unit 150 (sheet feed, image formation, paper sheet conveyance, sheet ejection destination switching, descent of the elevating tray in a stacker, locking and unlocking of the front door of a stacker, post-processing, and the like), and controls paper sheet conveyance, image formation, sheet ejection, and the like. The printer controller 152 can also instruct the compression/decompression IC 125 to decompress compressed image data.

Further, a read controller 200 of the reading device 20 is connected to the printer controller 152 in a controllable manner. The printer controller 152 can issue a control instruction to the read controller 200 in accordance with a command from the image control CPU 113, and acquire state information about the reading device 20 from the read controller 200. The read controller 200 can control the entire reading device 20, and performs read control, conveyance control, and the like in the reading device 20. The read controller 200 can be formed with a CPU, a program for causing the CPU to operate, and the like.

A DRAM control IC 161 of the print controller 160 is also connected to the PCI bus 112. In a case where the image forming apparatus 10 is used as a network printer or a network scanner, the print controller 160 receives image data or the like from the external device 4 or the like connected to the network 3 with the image forming apparatus 10, or transmits image data acquired with the scanner unit 130 to the external device 4 or the like connected to the network 3.

In the print controller 160, an image memory 162 formed with a DRAM or the like is connected to the DRAM control IC 161. In the print controller 160, the DRAM control IC 161, a controller control CPU 163 that controls the entire print controller 160, and a LAN interface 165 are also connected to a common bus. The LAN interface 165 is connected to the network 3.

An IO 128 is also connected to the image control CPU 113. In the IO 128, signaling with various sensors inside and outside the image forming system 1 is possible, and, for example, results of image reading can be acquired from the image readers 24 and 25.

The external device 4 connected to the image forming system 1 includes an external controller 400 that controls the entire external device 4, an external display unit 410, and an external operation unit 420. As for the external display unit 410 and the external operation unit 420, the operation unit and the display unit may be integrally formed with an LCD equipped with a touch panel.

The external controller 400 includes a CPU and programs operating in the CPU. The external device 4 may be designed to control the image forming apparatus 10, the reading device 20, and the stackers 30, 40, and 50. In that case, the external controller 400 functions as the controller of an embodiment of the present invention, and the hardware of the external controller 400 is equivalent to a computer in which the program of an embodiment of the present invention is executed. In this case, the external device 4 as an image forming system can determine the quality of images in a recording medium in accordance with results of image reading, and can further perform control in the stackers.

Next, the basic operation of the image forming system 1 is described.

First, the procedures for storing image data in the image forming system 1 are described.

A case where an image is read with the scanner unit 130, and image data is generated in the image forming system 1 is first described. First, an image is optically read from a document by the CCD 131 in the scanner unit 130. At this stage, the image control CPU 113 issues a command to the scanner controller 132, and the scanner controller 132 controls the operation of the CCD 131. The reading of the document may be performed while the document is being fed by the automatic document feeder (ADF) 135, or after the document is placed on the platen glass. The image control CPU 113 operates in accordance with a program, and issues a command to the scanner unit 130 in accordance with an operation by the operation unit 140.

The image read by the CCD 131 is subjected to data processing by the read processing unit 117, and the image data subjected to the data processing is sent to the compression/decompression IC 125 via the DRAM control IC 111. The image data is then compressed by a predetermined method. The compressed data is stored into the compression memory 121 via the DRAM control IC 111. In a case where data is to be stored into the hard disk (HDD) 123, the data temporarily stored in the compression memory 121 is sent to the hard disk (HDD) 123 via the DRAM control IC 111.

Alternatively, image data can be input from the outside to the image forming system 1 via the network 3. Examples of the image data include image data generated by an application program or the like of the external device 4, and image data generated by another image forming apparatus. The data is received by the print controller 160 via the network 3 and the LAN interface 165, and is temporarily stored into the image memory 162 by the DRAM control IC 161. The data stored in the image memory 162 is transferred to the DRAM control IC 111 via the PCI bus 112, and is temporarily stored into the decompression memory 122. The data stored in the decompression memory 122 is sent to the compression/decompression IC 125 via the DRAM control IC 111, is compressed, and is stored into the compression memory 121 via the DRAM control IC 111. In a case where the data is to be stored into the hard disk (HDD) 123, the data temporarily stored in the compression memory 121 is sent to the hard disk (HDD) 123 via the DRAM control IC 111.

Next, in a case where an image is to be output by the image forming system 1, data stored in the compression memory 121 or the hard disk (HDD) 123 is used. The image data stored in the hard disk (HDD) 123 is temporarily stored into the compression memory 121 via the DRAM control IC 111. The data stored in the compression memory 121 is sent to the compression/decompression IC 125 via the DRAM control IC 111, and the data is decompressed. The decompressed data is sent to the write processing unit 126 via the DRAM control IC 111, and write data is generated. Writing is then performed on a photosensitive member at the LD 151.

In the printer unit 150, the printer controller 152, which has received a command from the image control CPU 113, controls the respective components such as the large-capacity sheet feeding units 60 and 70, the main-body sheet feeding unit 12, and the conveyance path 13. In the printer unit 150, image formation, transfer onto a paper sheet, fixing, conveyance to the reading device 20 through a conveyance path, image reading at the reading device 20, paper ejection into the stacker 30, 40, or 50, and the like are sequentially performed, and thus, a print output is performed.

Further, in the image forming apparatus 10, the image control CPU 113 can acquire the results of image reading performed by the image reader 24 and/or the image reader 25 through the IO 128, and the image controller 100 can determine the quality of an image on a conveyed paper sheet in accordance with the results of the image reading.

A paper sheet from which an image has been read is ejected into the ejector. In a case where the ejector has more than one ejection destination into which paper sheets can be ejected, paper sheets are ejected into a predetermined ejector in accordance with settings.

Figure 3:
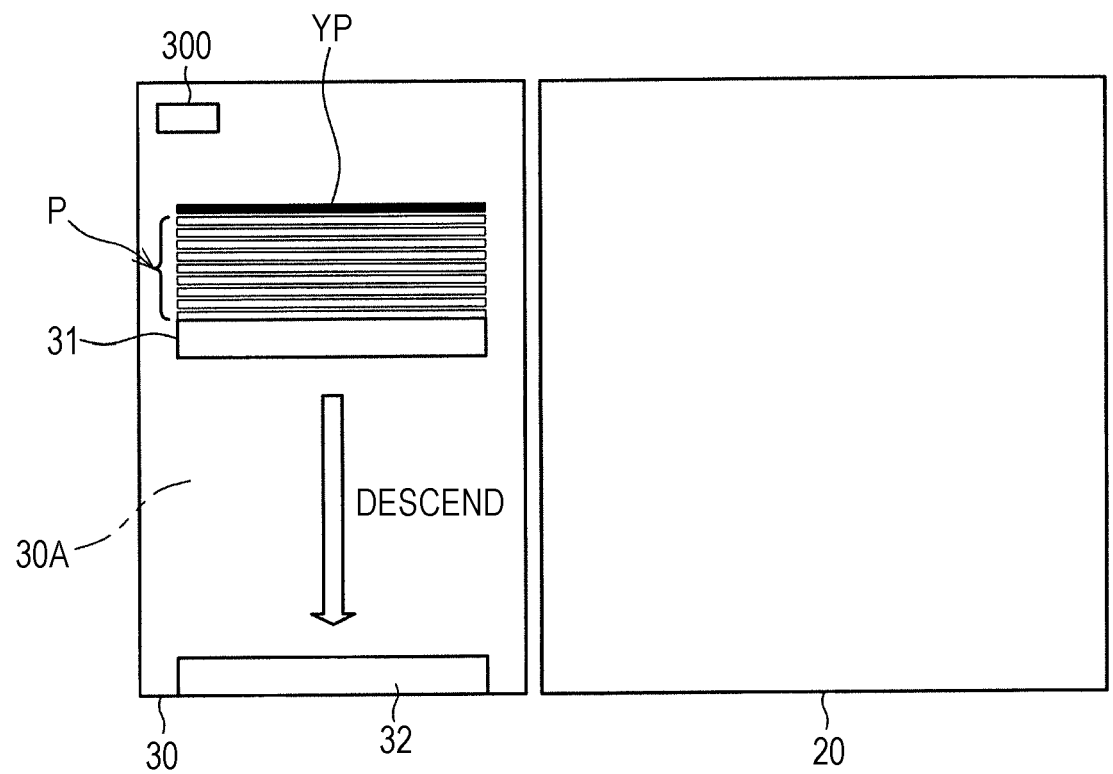
FIG. 3 is a diagram showing a mechanical outline of part of the image forming system.

FIG. 3 shows a state in which paper sheets P have been ejected into the stacker 30, and the paper sheets P are stacked on the elevating tray 31. In the situation shown in this example, a wasted paper sheet YP having an abnormality in the image read by the reading device 20 is stacked on the uppermost surface in the stacker 30.

In this embodiment, the image controller 100 acquires the image reading results obtained by the reading device 20, and the image controller 100 determines the quality of the images in accordance with the read results. However, these operations may be controlled by the external device 4, the reading device 20, or one of the stackers 30, 40, and 50, as described above. In other words, the read controller 200 can acquire read results, determine the quality the images in the recording medium in accordance with the read results, and further perform control at the ejector. In this case, the image forming system of an embodiment of the present invention may be formed only with a reading device, and the reading device may include an ejector. Further, an image forming apparatus may be included. The reading device and the ejector are not necessarily connected to the image forming apparatus in an in-line manner.

Further, in a case where the stacker into which paper sheets are to be ejected is the stacker 30, for example, the ejector controller 300 may determine the quality of images in accordance with the results of reading performed at the reading device 20, and control sheet ejection into the ejector, the ascending/descending operation of the elevating tray 31 in the stacker 30, and locking and unlocking of the front door 30A. In this case, the image forming system of an embodiment of the present invention may be formed only with the ejector, and the ejector may include a reading device and an image forming apparatus.

The following is a description of an example of control to be performed in the ejector in a case where it is determined that there is an abnormality in an image in accordance with the results of reading performed by the image readers of the reading device. The procedures described below are carried out under the control of the controller.

Figure 5:
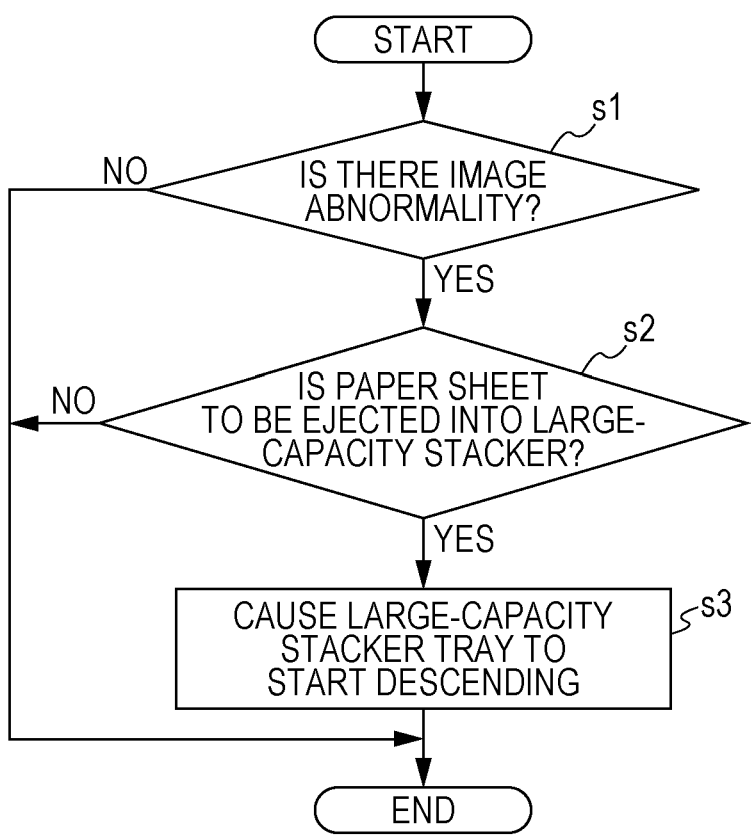
FIG. 5 is a flowchart showing the procedures for ejecting a wasted paper sheet into a stacker and causing the stacker to start descending in a case where an image has an abnormality.

As shown in FIG. 5, in conjunction with an output of a job, a check is made to determine whether there is an abnormality in an image in accordance with the results of reading performed by the image readers (step s1). If it is determined that there is no abnormality in the image (step s1: No), the procedures come to an end.

If there is an abnormality in the image (step s1: Yes), a check is made to determine whether the paper sheet is to be ejected into a large-capacity stacker (step s2). If the paper sheet is not to be ejected into a large-capacity stacker (step s2: No), the procedures come to an end. A large-capacity stacker is capable of storing a larger number of ejected paper sheets than a sheet catch tray or the like. Note that the present invention is not limited to stackers having a large capacity. The same applies in the example cases described below.

If the paper sheet is to be ejected into a large-capacity stacker (step s2: Yes), control on descent of the elevating tray of the large-capacity stacker is started (step s3), and the process is ended.

In this example, when a wasted paper sheet is ejected, control on descent of the elevating tray is started. The control on the descent is started at a predetermined timing. The control may be started immediately if possible. When the elevating tray has finished descending, the front door of the stacker is unlocked so that the user can open the front door.

A wasted paper sheet may be ejected into the stacker into which outputs of jobs are normally ejected, or may be ejected into an ejector other than the stacker.

Next, the procedures to be carried out in a case where a stacker and an ejector other than the stacker are provided are described. The ejector other than the stacker may be a sheet catch tray, or may be a different stacker from the stacker. The procedures described below are carried out under the control of the controller.

In this example, when an abnormal image is detected, the wasted paper sheet is ejected into the stacker to which jobs are normally output, the subsequent paper sheets already fed into the apparatus are ejected into the ejector other than the stacker, and control is performed so that the elevating tray onto which the wasted paper sheet is ejected is made to descend after sheet ejection destinations are switched.

Figure 6:
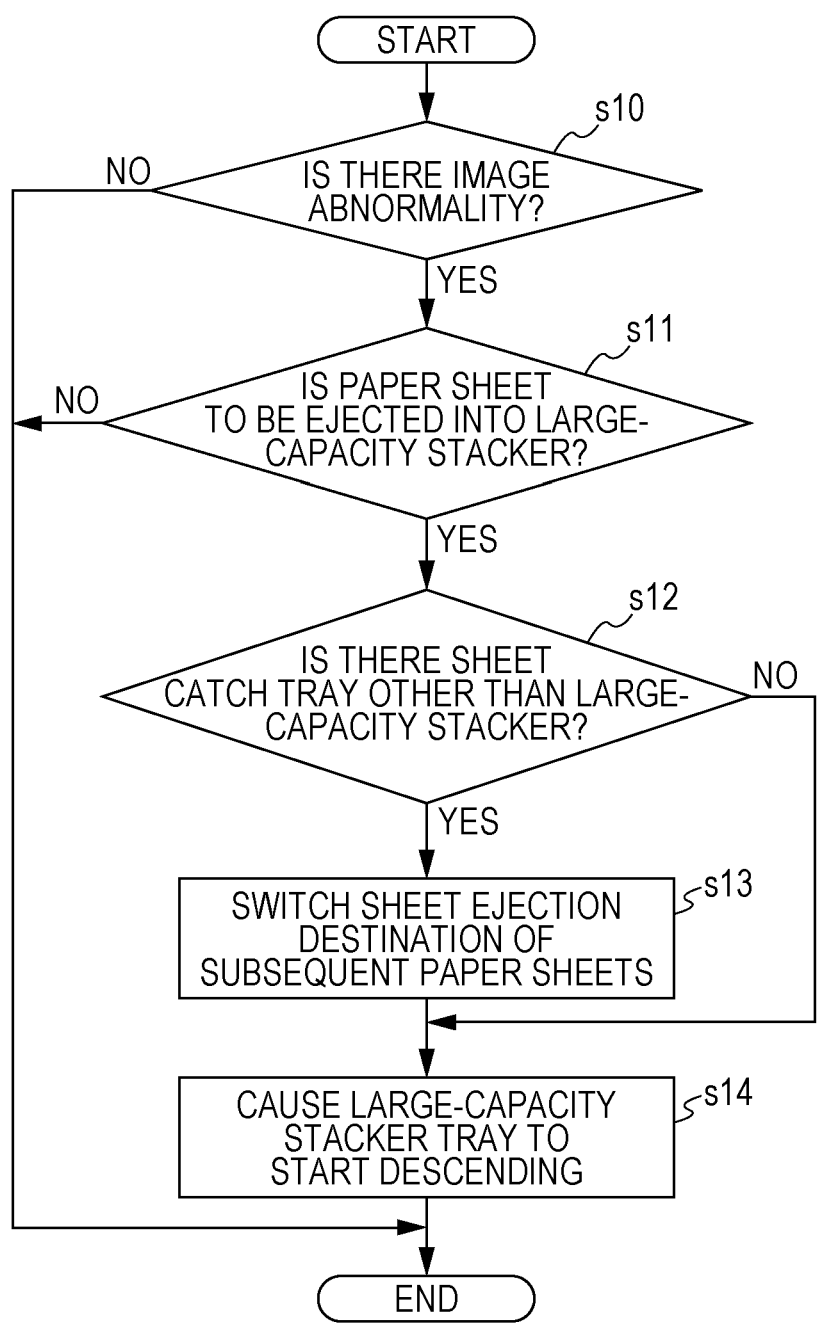
FIG. 6 is a flowchart showing the procedures for ejecting a wasted paper sheet into a stacker in a case where an image has an abnormality, and switching the ejection destination of the subsequent paper sheets and causing the stacker to start descending in a case where there is an ejector other than the stacker.

As shown in FIG. 6, in conjunction with an output of a job, a check is made to determine whether there is an abnormality in an image in accordance with the results of reading performed by the image readers (step s10). If it is determined that there is no abnormality in the image (step s10: No), the procedures come to an end.

If there is an abnormality in the image (step s10: Yes), a check is made to determine whether the paper sheet is to be ejected into a large-capacity stacker (step s11). If the paper sheet is not to be ejected into a large-capacity stacker (step s11: No), the procedures come to an end.

If the paper sheet is to be ejected into a large-capacity stacker (step s11: Yes), a check is made to determine whether there is a sheet catch tray other than the large-capacity stacker (step s12). If there is more than one stacker, the other stacker is another ejector.

If there is no sheet catch tray other than the large-capacity stacker (step s12: No), the process moves on to step s14, and the elevating tray of the large-capacity stacker starts to descend (step s14).

When there is a sheet catch tray other than the large-capacity stacker (step s12: Yes), the ejection destination of the subsequent paper sheets already fed into the apparatus is switched (step s13). While the subsequent paper sheet are ejected, descent of the elevating tray of the large-capacity stacker is started (step s14). After that, the procedures come to an end. In this example, the descent of the elevating tray starts at the same time as the switching of the ejection destination of the subsequent paper sheets. Thus, control on the start of the descent of the elevating tray can be performed before the ejection of the subsequent paper sheets is completed.

Figure 7:
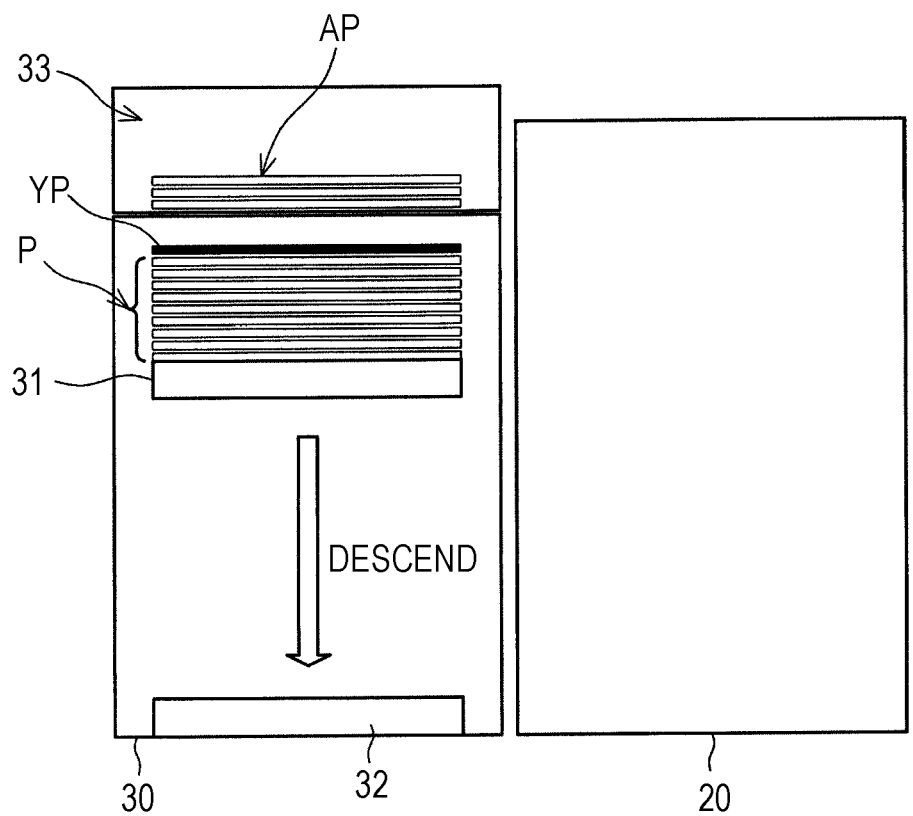
FIG. 7 is a diagram for explaining a state in which a wasted paper sheet is ejected into a stacker, and the subsequent paper sheets are ejected into an ejector other than the stacker, in a case where an image has an abnormality.

The ejector that is used in the above procedures is now described with reference to FIG. 7.

Here, the stacker 30 is taken as an example. The stacker 30 has a sheet catch tray 33 inside or outside the stacker 30. According to the above procedures, when it is determined that there is an abnormality in an image, the wasted paper sheet is ejected to the uppermost portion in the stacker 30, and the subsequent paper sheets already fed into the apparatus are ejected onto the sheet catch tray 33. When the ejection destination is switched to the sheet catch tray 33, the elevating tray 31 is controlled to start descending. When the descent is completed, the front door 30A is unlocked, and the procedures come to an end. Although the sheet catch tray 33 is located on the stacker 30 in the drawing, the position of the sheet catch tray 33 is not limited to any particular position, as long as the sheet ejection destination can be switched to the sheet catch tray 33.

Figure 8:
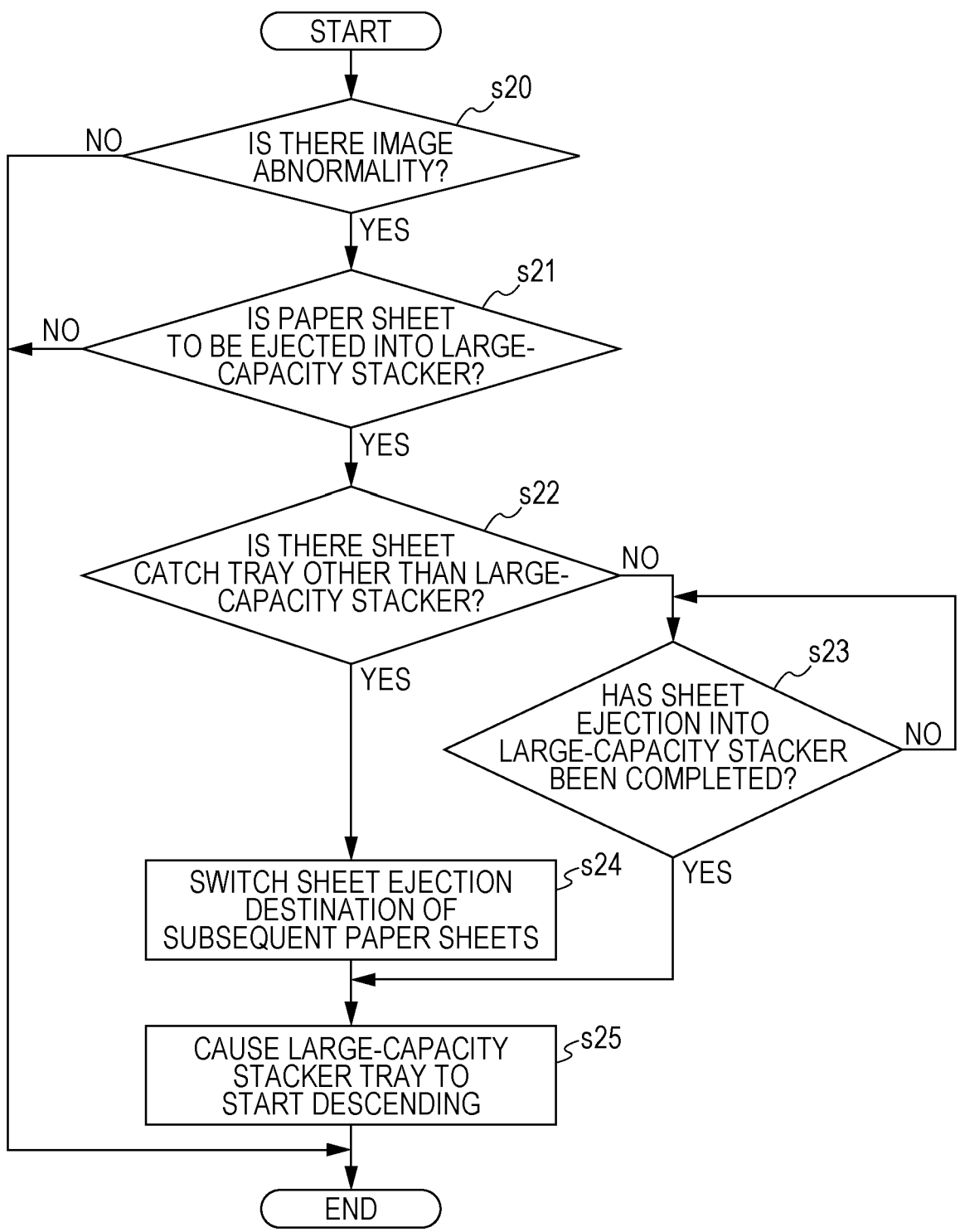
FIG. 8 is a flowchart showing the procedures for ejecting a wasted paper sheet into a stacker in a case where an image has an abnormality, and determining the ejection destination of the subsequent paper sheets and causing the stacker to start descending, depending on whether there is another ejector.

Next, the procedures for controlling sheet ejection depending on whether there is another ejector other than the stacker to which jobs are normally output are described with reference to the flowchart shown in FIG. 8. The procedures described below are carried out under the control of the controller.

In conjunction with an output of a job, a check is made to determine whether there is an abnormality in an image in accordance with the results of reading performed by the image readers (step s20). If it is determined that there is no abnormality in the image (step s20: No), the procedures come to an end.

If there is an abnormality in the image (step s20: Yes), a check is made to determine whether the paper sheet is to be ejected into a large-capacity stacker (step s21). If the paper sheet is not to be ejected into a large-capacity stacker (step s21: No), the procedures come to an end.

If the paper sheet is to be ejected into a large-capacity stacker (step s21: Yes), a check is made to determine whether there is a sheet catch tray other than the large-capacity stacker (step s22). If there is more than one stacker, the other stacker is regarded as another ejector.

If there is no sheet catch tray other than the large-capacity stacker (step s22: No), the wasted paper sheet and the paper sheets already fed into the apparatus continue to be ejected into the large-capacity stacker (step s23: No). When the sheet ejection is completed (step s23: Yes), the process moves on to step s25, and control is performed so that the elevating tray of the large-capacity stacker starts descending. When the descent is completed, the front door is unlocked, and the procedures come to an end.

If there is a sheet catch tray other than the large-capacity stacker (step s22: Yes), the wasted paper sheet is ejected into the large-capacity stacker, and the ejection destination of the subsequent paper sheets already fed into the apparatus is switched to the sheet catch tray (step s24). Alternatively, the wasted paper sheet may be ejected onto the sheet catch tray.

Control for causing the elevating tray of the large-capacity stacker to descend is then started. When the descent is completed, the front door 30A is unlocked, and the procedures come to an end.

Figure 9:
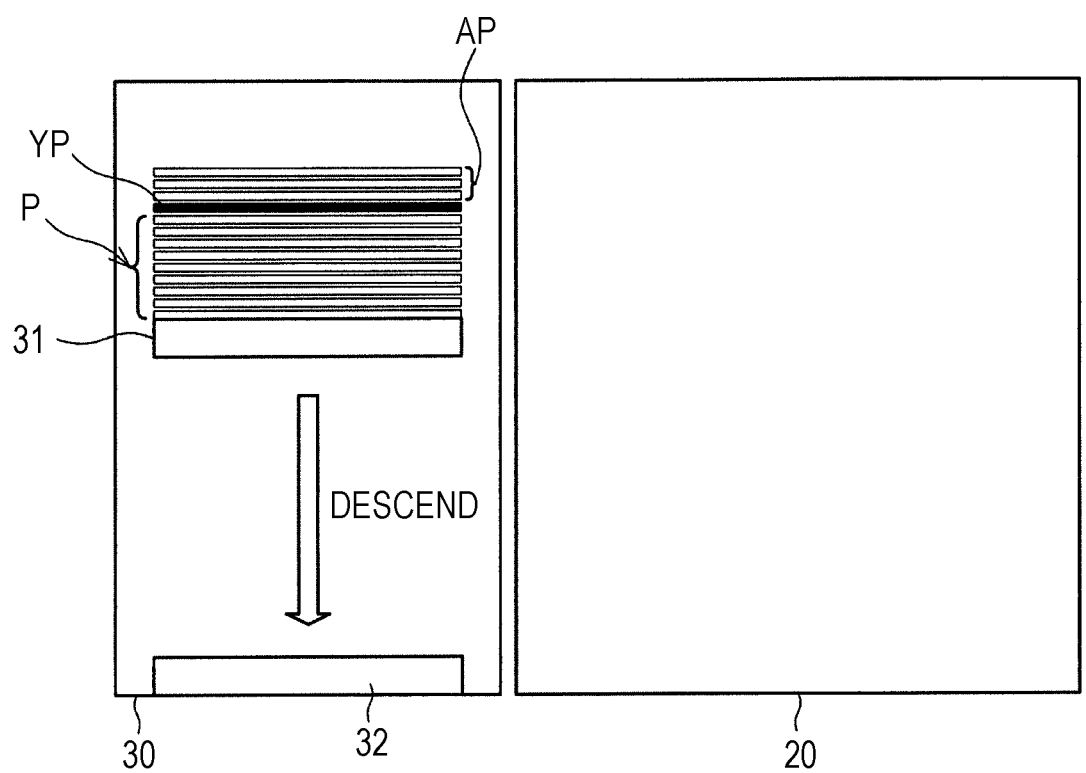
FIG. 9 is a diagram for explaining a state in which a wasted paper sheet is ejected into a stacker in a case where an image has an abnormality, and ejecting subsequent paper sheets onto the wasted paper sheet if there is no ejector other than the stacker.

A sheet ejected state in a case where there is no sheet catch tray other than the large-capacity stacker is now described with reference to FIG. 9.

In this example, the stacker 30 is described.

The stacker 30 is set as the normal output destination of jobs, and normal paper sheets P are stacked on the elevating tray 31. In a case where it is determined that there is an abnormality in an image in accordance with read results, the wasted paper sheet YP is ejected onto the normal paper sheets P. Further, if there are subsequent paper sheets already fed into the apparatus, there is no choice but to eject them into the stacker 30. Therefore, the subsequent paper sheets AP are sequentially stacked on the wasted paper sheet YP.

Figure 10:
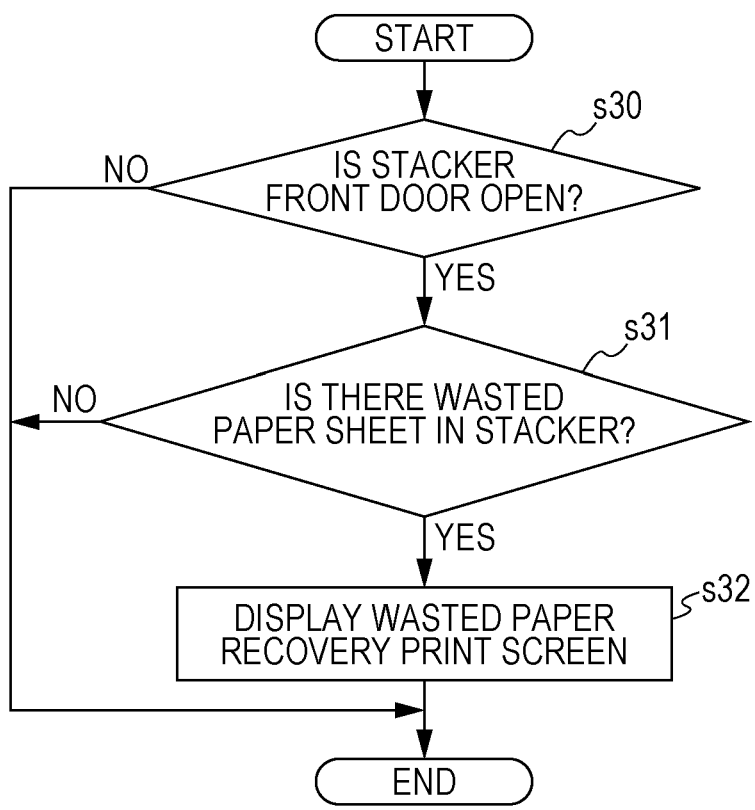
FIG. 10 is a flowchart showing the procedures to be carried out until a wasted paper recovery print screen is displayed after the stacker descends and the front door is opened.

Next, the instruction procedures for recovery printing to be performed when the elevating tray descends and the front door is opened are now described with reference to the flowchart shown in FIG. 10. The procedures described below are carried out under the control of the controller.

A procedure is started when the descent of the elevating tray is completed, and a check is made to determine whether the front door of the stacker is open (step s30). If the front door is not open (step s30: No), the procedures come to an end.

If the front door is open (step s30: Yes), a check is made to determine whether there is a wasted paper sheet in the stacker (step s31). If there is no wasted paper sheet in the stacker (step s31: No), the procedures come to an end. If there is a wasted paper sheet in the stacker (step s31: Yes), control for displaying the recovery print screen for the wasted paper sheet is performed (step s32), and the procedures come to an end.

The controller may determine whether there is a wasted paper sheet in the stacker, or the operator may determine and indicate the existence of a wasted paper sheet via the operation unit or the like. The wasted paper recovery print screen may be displayed on the operation unit 140 in an operable manner, for example. However, control may be performed so that the wasted paper recovery print screen is displayed on a display unit outside the image forming apparatus 10. For example, control may be performed so that the wasted paper recovery print screen is displayed on the external display unit 410 of the external device 4 and can be operated through the external operation unit 420.

Figure 11:
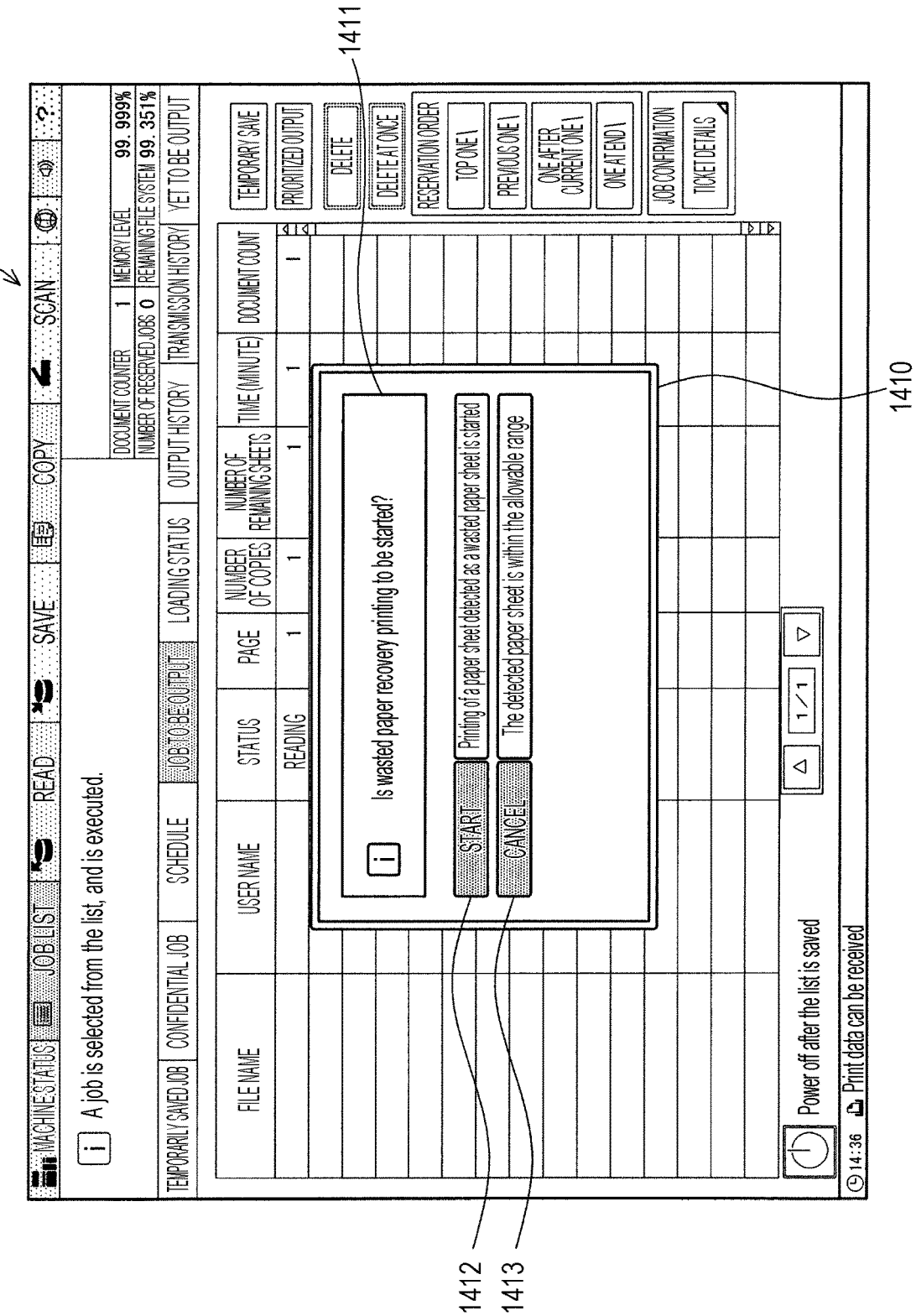
FIG. 11 is a diagram showing an example of display of the wasted paper recovery print screen.

Next, an example of the wasted paper recovery print screen is shown in FIG. 11. A wasted paper recovery print screen 1410 is displayed in a pop-up manner in an output reserved job setting screen of the operation unit 140.

In the wasted paper recovery print screen 1410, an inquiry is made as to whether to start recovery printing for a wasted paper sheet in a display region 1411, and a start button 1412 and a cancel button 1413 are displayed so as to be operated. The remarks column of the start button 1412 shows "Printing of a paper sheet detected as a wasted paper sheet is started", and the remarks column of the cancel button 1413 shows "The detected paper sheet is within the allowable range".

When the start button 1412 is pressed, printing of the detected wasted paper sheet is started. When the cancel button 1413 is pressed, the recovery printing is canceled, and the wasted paper recovery print screen 1410 is also closed.

Even after the sheet ejection destination is changed, at a time of recovery printing of a wasted paper sheet, it is necessary to perform an operation of aligning the stacked wasted paper sheet and the subsequent paper sheets with the paper sheet subjected to the recovery printing. If a wasted paper sheet is removed from a large number of ejected paper sheets, or recovery printing is performed, the work efficiency becomes lower due to the operation. Therefore, in a case where recovery printing is performed, control may be performed so that the procedures for replacing the wasted paper sheet or the paper sheet subjected to the recovery printing are displayed on the screen. In this manner, the replacement process can be facilitated.

Note that, in the control on the descent of the elevating tray, the sheet ejection destination or the timing of the descent of the elevating tray may be changed in accordance with the contents of the job.

For example, in a case where the job is to print an image of a sheet on paper sheets (mass printing, for example), a paper sheet determined to be a wasted paper sheet is ejected into a different ejector from the stacker that is the normal job output destination, and the elevating tray in the stacker as the normal output destination is not made to descend. This is because, when a wasted paper sheet is detected, there is rarely a request for removal of the paper sheet from the stacker in this case.

Figure 12:
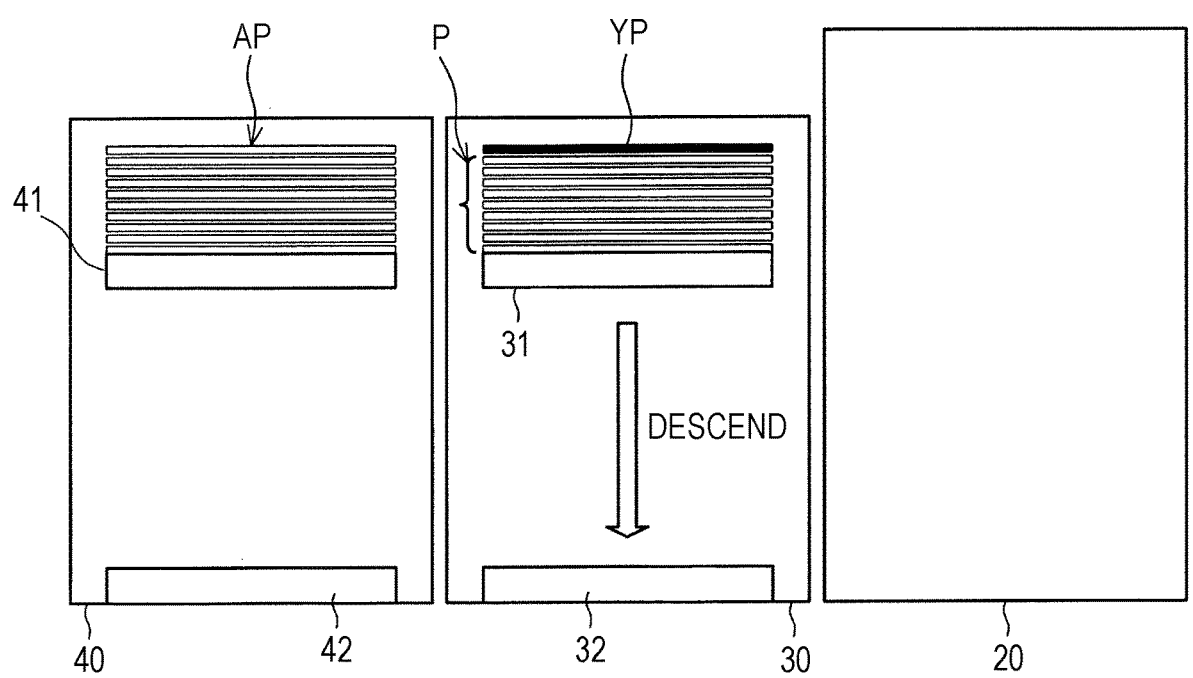
FIG. 12 is a diagram for explaining ejection of a wasted paper sheet and the subsequent paper sheets in a case where the job is to print a booklet.

Further, in a case where the job is to print a booklet that is formed with pages, as shown in FIG. 12, a wasted paper sheet is ejected into a stacker, and the succeeding paper sheets already fed into the apparatus are ejected into an ejector other than the stacker. In FIG. 12, a normal output of a job is ejected into the stacker 30, and the stacker 40 is used as an ejector other than the stacker. After the ejection destination of the subsequent paper sheets is changed, control is started to cause the elevating tray of the stacker 30 to descend.

As described above, through the ejector control, it is possible to automatically determine the ejection destination of a paper sheet determined to be a wasted paper sheet, or the ejection destination of the subsequent paper sheets if there are subsequent paper sheets already fed into the apparatus, in accordance with the number of connected stackers, information about the existence/absence of a sheet catch tray other than the stackers, and the job settings during printing.

According to an embodiment of the present invention, when an image on a recording medium is determined to have an abnormality, the timing to lower the elevating tray of a stacker is controlled. Thus, the recording medium that has the abnormal image and has been ejected into an ejector can be readily and promptly removed.

Although embodiments of the present invention have been described and illustrated in detail, the disclosed embodiments are made for purposes of illustration and example only and not limitation. The scope of the present invention should be interpreted by terms of the appended claims. Modifications may be made to them without departing from the scope of the present invention.

What is claimed is:

1. An image forming system comprising:
    an ejector configured to receive a plurality of sheets of recording medium, and
    a hardware processor that has a function of acquiring results of reading images on the plurality of sheets of recording medium, and determining a quality of the read images, and controls the ejector and sheet ejection into the ejector, the ejector including at least a stacker, wherein
    the stacker includes an elevating tray on which ejected sheets of recording medium are stacked, and has a mechanism that enables removal of the sheets of the recording medium placed on the elevating tray after the elevating tray is lowered to a predetermined position, the elevating tray being capable of ascending and descending, and,
    when a print job of multiple sheets is being run, and the stacker is set as an ejection destination, and an image on one of the sheets of recording medium is determined to be abnormal through the determination of the quality of the image, the hardware processor determines a timing to cause the elevating tray of the set stacker to descend after the one sheet is ejected and before all of the multiple sheets are printed and ejected.

2. The image forming system according to claim 1, further comprising
    a reader that reads an image formed on a recording medium.

3. The image forming system according to claim 2, further comprising
    an image forming part that is located at a stage before the reader, and forms an image on a recording medium.

4. The image forming system according to claim 1, wherein the stacker includes a lockable door.

5. The image forming system according to claim 4, wherein the lockable door is unlocked when the elevating tray is lowered to the predetermined position.

6. The image forming system according to claim 1, wherein the ejector comprises one or a plurality of ejectors.

7. The image forming system according to claim 1, further comprising
    a post-processing device that performs post-processing on a recording medium ejected into an ejector.

8. The image forming system according to claim 1, wherein,
    when there is an ejector other than the ejector including the stacker set as an ejection destination, and an image is determined to be abnormal, the hardware processor performs control to eject the recording medium having the image determined to be abnormal into the stacker, change an ejection destination of subsequent recording mediums already supplied, eject the subsequent recording mediums into a different ejector from the set stacker, and cause an elevating tray of the set stacker to start descending after the change of the ejection destination.

9. The image forming system according to claim 1, wherein, when there is an ejector other than the ejector including the stacker set as an ejection destination, the hardware processor performs control to cause an elevating tray of the set stacker to start descending before completion of ejection of the recording medium having an image determined to be abnormal and already supplied subsequent recording mediums into the ejector.

10. The image forming system according to claim 1, wherein, when there is no ejector other than the ejector including the stacker set as the ejection destination, and already supplied subsequent recording mediums following the recording medium having an image determined to be abnormal need to be ejected into the stacker, the hardware processor performs control to cause the elevating tray to descend after the subsequent recording mediums are ejected into the stacker.

11. The image forming system according to claim 1, wherein, when descent of the elevating tray of the stacker is completed, and an opening/closing door provided in the stacker is opened, the hardware processor performs control to display a screen that accepts an input indicating necessity/unnecessity of recovery printing.

12. The image forming system according to claim 11, wherein, when the recovery printing is selected, the hardware processor performs control to display a replacement procedure for replacing a recording medium having an image determined to be abnormal and a recording medium subjected to the recovery printing.

13. The image forming system according to claim 1, wherein, when a recording medium to be subjected to image reading and ejection is output in accordance with a job for printing one image onto a plurality of sheets, and there is an ejector other than the ejector including the stacker set as an ejection destination, the hardware processor ejects a recording medium having an image determined to be abnormal after changing the ejection destination to an ejector other than the stacker set as the ejection destination, and does not cause the elevating tray of the set stacker to descend.

14. The image forming system according to claim 1, wherein, when a recording medium to be subjected to image reading and ejection is output in accordance with a job for printing a booklet, and there is an ejector other than the ejector including the stacker set as an ejection destination, the hardware processor ejects subsequent recording mediums following a recording medium having an image determined to be abnormal after changing the ejection destination to the ejector other than the stacker set as the ejection destination, and causes the elevating tray of the set stacker to start descending after the change of the ejection destination.

15. The image forming system according to claim 1, wherein the hardware processor automatically determines an ejection destination of a recording medium having an image determined to be abnormal, in accordance with the number of connected stackers, information about presence/absence of an ejector other than the stacker, and job settings during printing.

16. The image forming system according to claim 1, wherein the sheets of the recording medium that are received by the stacker after the one sheet is received are stacked on a tray other than the elevating tray.

17. The image forming system according to claim 1, wherein when there is no other sheet catch tray other than the elevating tray, and the image on the one of the sheets is determined to be abnormal through the determination of the quality of the image, the hardware processor determines a timing to cause the elevating tray of the set stacker to descend after the one sheet and sheets present in the system at the time of detecting the abnormal sheet are ejected.

18. The image forming system according to claim 1, wherein image forming system includes an additional sheet catch tray for receiving sheets, and the image on the one of the sheets is determined to be abnormal through the determination of the quality of the image, the hardware processor determines a timing to cause the elevating tray of the set stacker to descend after the one sheet is ejected and before any subsequent sheets are ejected onto the stacker.

* * * * *